Aug. 23, 1927.
J. R. McGIFFERT
TRACTOR SKIDDER
Filed Oct. 19, 1921
1,639,806
3 Sheets-Sheet 2
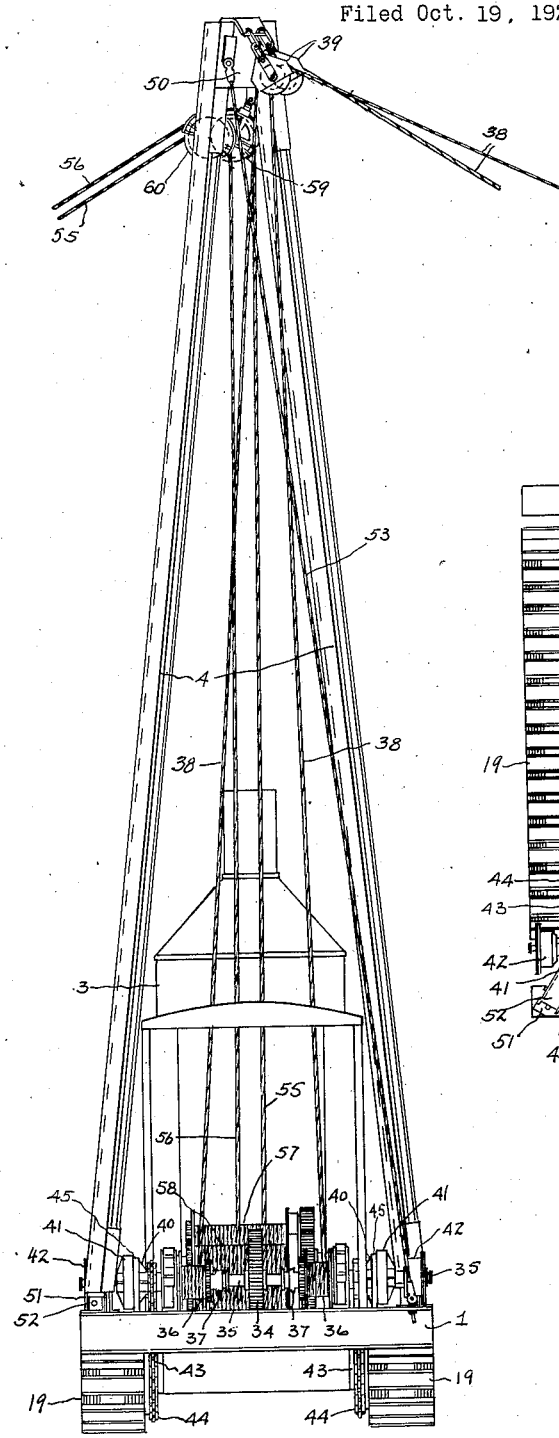
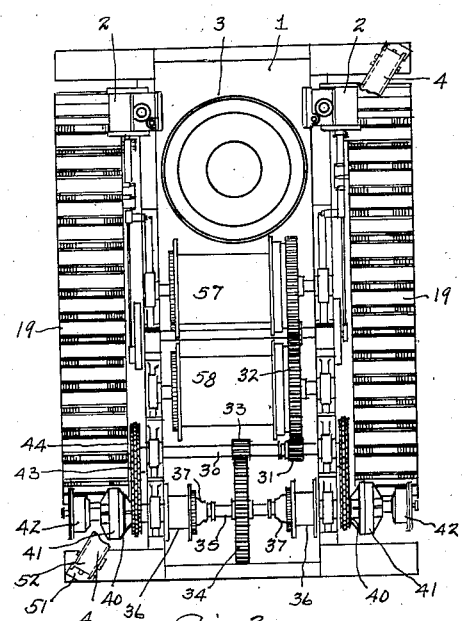
INVENTOR.
John R. McGiffert
BY
Fay, Oberlin & Fay.
ATTORNEYS Aug. 23, 1927.
J. R. McGIFFERT
TRACTOR SKIDDER
Filed Oct. 19, 1921
1,639,806
3 Sheets—Sheet 3
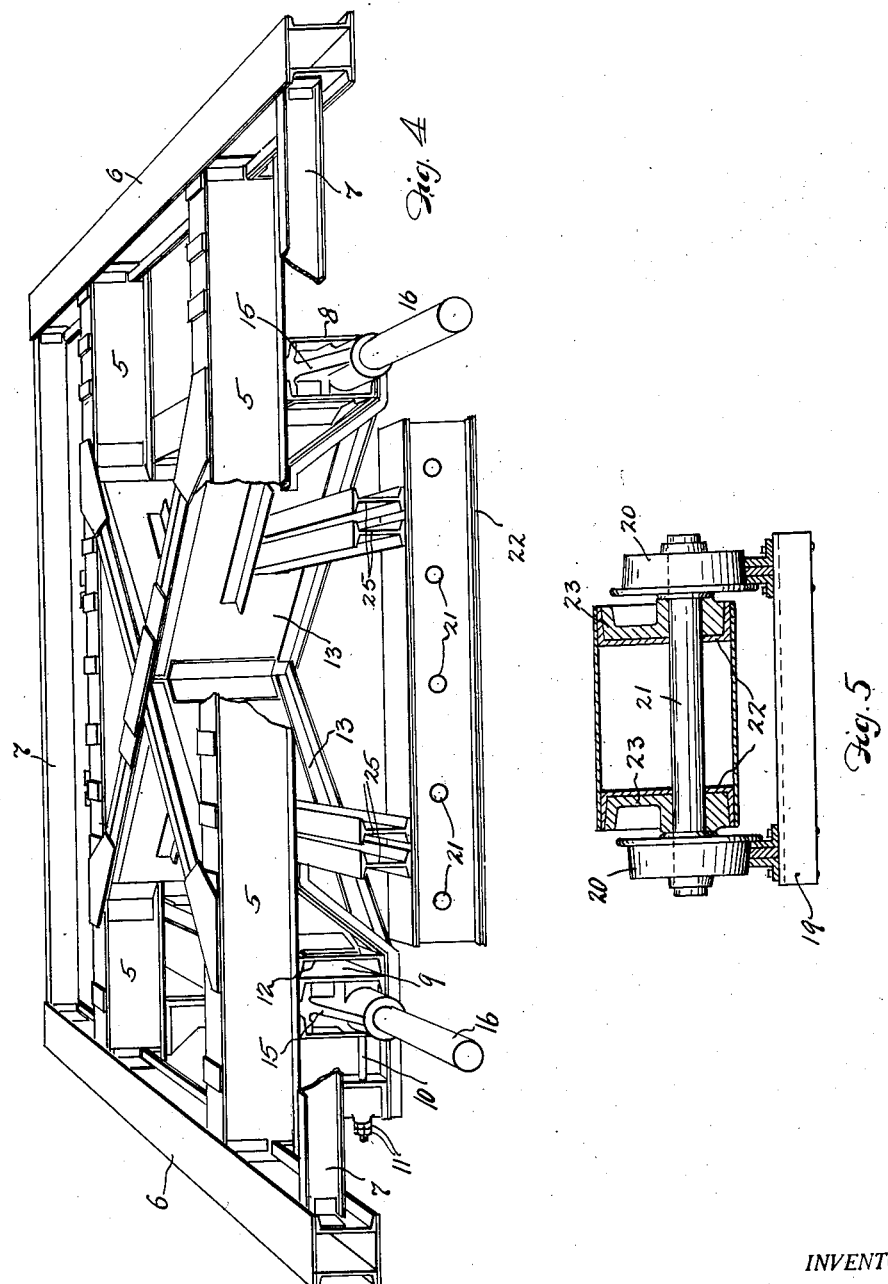
INVENTOR.
John R. McGiffert
BY
Fay, Oberlin & Fay
ATTORNEYS Patented Aug. 23, 1927.

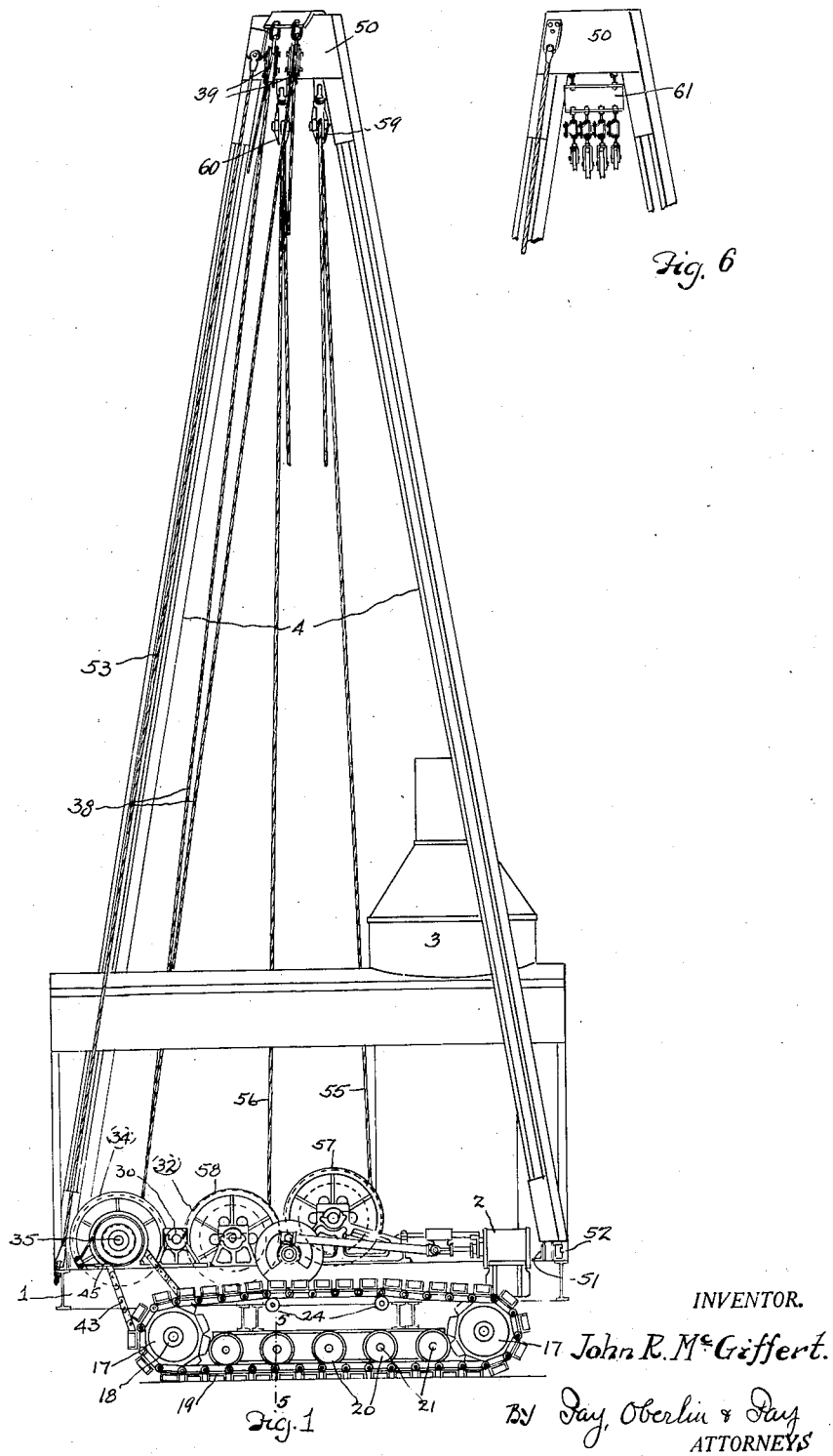

1,639,806

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

TRACTOR SKIDDER.

Application filed October 19, 1921. Serial No. 508,898.

The present invention relating, as indicated, to a tractor skidder is designed for use in conducting logging operations in places where it is very difficult or too expensive to extend railroad tracks into close proximity to the scene of operations. The object of the invention accordingly is to provide a movable mounting for a skidding mechanism, such mounting taking the form of a tractor of the continuous tread or crawler type. Further objects are to so arrange the elements of the skidding mechanism as to make the machine readily transportable on the crawler mechanism, and incidentally to so construct the base or platform of the tractor as to prevent distortion when the machine runs over or stands upon rough or uneven ground. A novel arrangement of guying and propelling means is also involved as well as the provision of means for turning the tractor sharply around.

To the accomplishment of the foregoing and related ends the invention then consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is a side elevation of my improved tractor skidder in assembled condition; Fig. 2 is an end view thereof; Fig. 3 is a plan view of the tractor proper, the skidding boom and the lines or cables that run thereover being omitted to avoid confusion; Fig. 4 is a broken perspective view of the platform or body of the tractor, the operating and propelling mechanism being omitted; Fig. 5 is a cross section showing a detail of the mechanism, the plane of the section being indicated by the line 5—5, Fig. 1; and Fig. 6 is a side elevation of the upper portion of the skidding boom corresponding with the view of Fig. 1 but showing a modified arrangement of the skidding and guying blocks.

The supporting body or platform 1 of the tractor constitutes the base on which is mounted an engine 2 with a boiler 3 for supplying steam thereto, as well as a derrick or skidding boom 4 the construction of which will presently be set forth in more detail.

Said supporting body or platform as best illustrated in the broken perspective view of Fig. 4 is composed of longitudinal beams or girders 5, 5, joined at their respective ends by transverse girders 6, 6, on the top of which is laid, so far as necessary, a floor or deck, the latter being additionally supported where it extends beyond said longitudinal girders by means of channels 7, 7. The two longitudinal girders 5, 5, rest on two transverse girders 8, 9, the first whereof is rigidly fixed to said longitudinal girders, while the second is held against vertical or end motion but is adjustable lengthwise of said girders by means of adjusting bolts 10 and nuts 11 for a purpose presently to be explained. Immediately adjacent to girder 9 is a transverse channel 12 rigidly secured to the longitudinal beams or girders 5, 5; while two diagonal girders 13, 13, intersecting in the form of an X, are likewise secured to said longitudinal girders and to girders 8 and 12, said diagonal girders being flush on top with the longitudinal girders 5, 5, and on the bottom with such last mentioned transverse girders. Such diagonal or cross girders thus not only serve to unite into a strong and compact frame the deck supporting girders proper but also the transverse girders 8 and 9 which support the traction members proper as will be subsequently described; accordingly, they prevent any torsion or twisting of the frame when operating over rough or uneven ground. The features of the frame construction are more especially dealt with and claimed in my divisional application, Ser. No. 738,393, filed Sept. 18, 1924.

Fixed in each end of each of said cross girders 8 and 9 is a casting 15 in which is in turn rigidly fixed an axle 16. Loosely mounted on the latter are sprocket wheels 17 being secured to the axles by collars 18 and around such sprocket wheels extend traction chains 19, the detailed construction of which is not of present interest, there being a variety of such chains in commercial use.

On each side of the base of the supporting body or platform, intermediately of the corresponding sprocket wheels 17, a series of flanged bearing wheels 20 is provided to engage the links of the traction chain passing around said sprocket wheels. Such wheels 20 thus engage the lower portion of the traction chain and are mounted in pairs on axles 21 that extend through longitudinal girders 22 (see Figs. 4 and 5), such axles turning in suitable boxes 23, therefor provided. The girders 22 are, as best shown in Fig. 4, carried by pairs of transverse beams 25 that pass through the diagonal or cross girders 13 and contact with the under sides of the longitudinal beams or girders 5, 5, of the main frame. The traction members are thus enabled to support said main frame directly both through the medium of the sprocket wheels 17 but more especially through the roller wheels 20. By virtue of the adjustable mounting provided for the forward axles, the traction chains may be tightened or loosened as occasion may require in order to retain same in easy running condition around such sprocket wheels and roller wheels. The slack in the upper portion of each traction chain is taken up and such portion supported by other smaller roller wheels 24, as shown in Fig. 1.

Journalled in suitable bearings provided above the deck or platform of the main frame is a transverse shaft 30 that is adapted to be rotated by the engine 2 by sliding pinion 31 into engagement with the engine driven gear 32, such pinion sliding on a feather key fixed in shaft 30 as need not be explained in detail. Keyed to said shaft 30 is a pinion 33 that meshes with a gear 34, keyed in turn to a second transverse shaft 35. Loosely mounted on the latter are two guying drums 36, 36, that are adapted to be interlocked with said shaft by means of spiral jaw clutches 37, 37, respectively. These drums 36 respectively operate the two guy lines 38 which are run through suitable blocks 39 at or near the top of the boom 4 and are then secured at their free ends to trees, stumps or other fixed objects so as to hold said boom in position during the skidding operation.

When the guys are thus set, ratchet dogs (not shown) hold the drums from turning, as will be readily understood. It should be explained that the jaw clutches 37 are of the spiral type so that when the engine is reversed, the clutches are automatically thrown out of engagement with the drums, a reversing engine being used not only for thus automatically throwing out the jaw clutches, which would otherwise be difficult when under load, but also to propel the machine in either direction through driving connections which will be hereinafter described.

In addition to such guying drums 36, two clutch sprockets 40, 40, are also loosely mounted on said shaft 35, such sprockets being engageable with the shaft by means of friction clutches 41, 41. In the specific embodiment illustrated, these clutches are designed to be operated by means of steam jams 42, but any other form of clutch actuating device may obviously be employed instead. The sprockets 40 are respectively connected by means of sprocket chains 43 with aligned sprocket wheels 44 fixed to the inside faces of the respective traction sprockets 17 located at the corresponding end of the machine. By means of the driving connections thus provided, it will be seen that either traction chain 19 may be driven independently of the other or both such chains may be driven in unison. I furthermore provide band brakes 45 in conjunction with sprockets 40, which serve to hold the machine in fixed position when desired, as may be necessary on a grade, and also to facilitate turning by positively locking the one such sprocket and thus the corresponding traction chain against movement while the other sprocket and chain are being driven.

The boom 4 comprises two members or legs disposed in the form of an inverted V, such members being suitably tied together at their upper ends by means of plates 50, that serve at the same time as means for attachment to the boom of the guying lines and other tackle. The lower ends of the boom members are pivotally connected with the main frame of the machine at diagonally opposite corners thereof by means of brackets 51 and pins 52, so that the boom as a whole may be raised and lowered when desired and may at the same time have a certain degree of flexibility in its relation to the frame. When in use it is held in upright position by means of the stationary guys 53.

The skidding lines 55 and 56 for pulling in the logs or like objects are wound on drums 57 and 58, respectively, mounted on the platform between the boiler 3 and the shaft 30, said drums being connected to be rotated from the engine in the usual manner. Such skidding lines pass through blocks 59 and 60, respectively, suspended from the upper end of the boom adjacent blocks 39 and may be carried out to the logs to be skidded either by hand, by horses or by other cables provided for that purpose.

When it is desired to move the machine into position for skidding, the pinion 31 is slid into mesh with the gear 32, and the clutch sprockets 40 are locked to the shaft 35. Thereupon by running the engine in one direction or the other, such engine being fitted with standard reversing mechanism, the machine may be run in a straight-away direction either forwardly or backwardly. When it is desired to change the direction of movement either to the right or to the left, one or the other of the clutches 41 is disengaged and the corresponding brake 45 applied which will cause the machine to turn as desired. Unless the brake is applied, the machine will have a tendency to run forward on the side where the traction chain is released and the turn be very gradual, but by applying the brake to the unclutched sprocket an extremely sharp turn is rendered possible.

When the machine has been brought to desired position, both of the clutches 41 are disengaged; the clutches 37 are engaged with the guy drums 36; the guy lines 38 are secured to proper anchorage and drawn tight by means of the drums; said clutches are then disengaged and the pinion 31 thrown out of mesh with the gear 32. The engine is in this way entirely disconnected from the guying and propelling mechanism and may be used for driving the drums 57 and 58 upon which the skidding lines are wound and the machine operated in the usual manner as a regular skidder.

When the machine is being moved from one place to another, if necessary, the boom may be removed ånd either carried separately or on the platform of the machine in horizontally disposed position. However, even with the boom up, the center of gravity is so low that the machine can be run over the steepest and roughest ground without danger of capsizing.

Instead of attaching the two guying blocks 39, 39, and the two skidding blocks 59 and 60, directly to the plates 50, which tie together the upper ends of the two members composing the boom, such blocks may be hung on a flexibly suspended beam 61, as shown in Fig. 6, the two outer blocks being for the guy lines and the two middle blocks for the skidding lines. It will be understood that the guys are set on the opposite side of the machine from the direction in which the skidding lines are run out, both in the case of this construction and the one previously described. The method of suspending the blocks thus shown in Fig. 6 has the advantage that it relieves the boom and machine from shocks in case the logs being drawn in strike obstructions.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination with a portable base frame of general rectangular form; of a boom mounted thereon, said boom consisting of two legs inclining toward each other and connected at their upper ends, the lower ends of said legs being attached to said frame at diagonally opposite corners.

2. In a machine of the character described, the combination with a portable base frame of general rectangular form; of a boom mounted thereon, said boom comprising two legs inclining toward each other and connected at their upper ends, the lower ends of said legs being pivotally attached to said frame at diagonally opposite corners about aligned axes.

3. In a machine of the character described, the combination of a base frame of general rectangular form; continuous tread members supporting said frame, one on each side thereof, whereon the latter is entirely supported; and a boom mounted on said frame, said boom consisting of two legs inclining toward each other and connected at their upper ends, the lower ends of said legs being attached to said frame at diagonally opposite corners.

4. In a machine of the character described, the combination of a base frame of general rectangular form; continuous tread members supporting said frame, one on each side thereof, whereon the latter is entirely supported; and a boom mounted on said frame, said boom comprising two legs inclining toward each other and connected at their upper ends, the lower ends of said legs being pivotally attached to said frame at diagonally opposite corners about aligned axes.

5. In a machine of the character described, the combination of a frame; continuous tread members supporting said frame, one on each side thereof; an engine mounted on said frame; a boom extending upwardly from said frame, said boom consisting of two legs attached to said frame at diagonally opposite corners and connected at their upper ends; a skidding drum mounted on said frame; and a skidding line attached to said drum and extending upwardly over and away from said boom.

6. In a machine of the character described, the combination of a frame; continuous tread members supporting said frame, one on each side thereof; an engine mounted on said frame; a boom mounted on said frame, said boom consisting of two legs inclining toward each other from diagonally opposite corners of said frame; a skidding drum mounted on said frame; a skidding line attached to said drum and extending upwardly over and away from said boom; a transverse shaft on said frame connected to drive said tread members; and a common chain of gears for driving said drum and said shaft from said engine.

7. In a machine of the character described, the combination of a frame; continuous tread members supporting said frame, one on each side thereof; an engine mounted on said frame adjacent one end thereof; a skidding drum mounted on said frame adjacent said engine; a boom mounted on said frame from points of support oppositely placed so that a plane therethrough would also pass through said skidding drum; a skidding line attached to said drum and extending over said boom; a transverse shaft on said frame at the opposite end thereof from said engine; guying drums loosely mounted on said shaft and adapted to be separately attached thereto for operation; driving sprockets loosely mounted on said shaft and connected to operate said tread members respectively; means adapted operatively to connect said sprockets and said shaft, as desired; and a common chain of gears for driving said skidding drum and said shaft from said engine.

8. In a machine of the character described, the combination of a frame; continuous tread members supporting said frame, one on each side thereof; an engine mounted on said frame adjacent one end thereof; a skidding drum mounted on said frame adjacent said engine; a transverse shaft on said frame at the opposite end thereof from said engine; guying drums loosely mounted on said shaft and adapted to be separately attached thereto for operation; a common chain of gears for driving said skidding drum and said shaft from said engine; a boom mounted on said frame, said boom consisting of two legs inclining toward each other from diagonally opposite corners of said frame; and guy lines attached to said guying drums and extending upwardly over said boom.

9. In a machine of the character described, the combination of a frame; continuous tread members supporting said frame, one on each side thereof; an engine mounted on said frame adjacent one end thereof; a transverse shaft mounted on said frame and connected to be driven by said engine; two skidding drums mounted on said frame, one on each side of said shaft and adapted to be operatively connected therewith as desired; a second transverse shaft mounted on said frame at the opposite end thereof from said engine; guying drums loosely mounted on said second shaft and adapted to be separately attached thereto for operation; driving sprockets loosely mounted on said second shaft and connected to operate said tread members; means adapted to operatively connect said sprockets and said second shaft, as desired; and gearing for driving said second shaft from said first shaft, said gearing including the driving connections for the skidding drum located between said two shafts.

Signed by me this 14th day of October, 1921.

JOHN R. McGIFFERT.